(12) United States Patent
Miller et al.

(10) Patent No.: US 6,450,304 B1
(45) Date of Patent: Sep. 17, 2002

(54) PISTON AND ROD ASSEMBLY FOR AIR-ACTUATED VARIABLE DAMPING

(75) Inventors: Troy Allen Miller; Michael L. Oliver, both of Xenia; William C. Kruckemeyer, Beavercreek; Eric L. Jensen, Dayton, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/781,868

(22) Filed: Feb. 12, 2001

(51) Int. Cl.$^7$ .................................................. F16F 9/44
(52) U.S. Cl. ........................ 188/266.5; 188/282.5; 188/322.15; 188/269; 267/122
(58) Field of Search ............................ 188/322.15, 280, 188/269, 298, 257, 266.5, 266.1, 266.2, 281, 322.13, 282.1, 282.5, 282.6, 282.4, 299.1, 322.22, 318, 317, 319.1, 322.14, 266.6; 267/64.11, 122, 64.15, 64.27, 113; 280/5.519, 124.157, 124.158, 124.161, 5.515

(56) References Cited

U.S. PATENT DOCUMENTS

| | | | |
|---|---|---|---|
| 4,478,431 A | | 10/1984 | Muller et al. |
| 4,589,528 A | | 5/1986 | Axthammer et al. |
| 4,683,992 A | * | 8/1987 | Watanabe |
| 4,834,088 A | * | 5/1989 | Jeanson |
| 5,207,300 A | * | 5/1993 | Engel et al. |
| 5,392,885 A | * | 2/1995 | Patzenhauer et al. |
| 5,533,596 A | * | 7/1996 | Patzenhauer et al. |
| 5,690,195 A | | 11/1997 | Kruckemeyer et al. |
| 5,706,919 A | | 1/1998 | Kruckemeyer |
| 5,725,239 A | | 3/1998 | de Molina |
| 5,924,528 A | | 7/1999 | Vermolen et al. |
| 6,161,662 A | * | 12/2000 | Johnston et al. ......... 188/282.3 |

FOREIGN PATENT DOCUMENTS

| | | | |
|---|---|---|---|
| FR | 2449236 | * | 9/1980 |
| JP | 1038008 | * | 10/1998 |

* cited by examiner

Primary Examiner—Douglas C. Butler
(74) Attorney, Agent, or Firm—Scott A. McBain

(57) ABSTRACT

A damper includes a piston that carries a relatively compact control valve for controlling fluid flow through the piston. The control valve provides a variable amount of damping by regulating damper fluid flow between the extension chamber and the compression chamber of the damper during extension and compression strokes. Pressure regulation across the piston is controlled through a flow path as determined by the control valve. The damping force of the damper varies depending upon the loading conditions of the vehicle. The control valve is air pressure actuated to adjust the damping force and control the flow of fluid in the flow path.

22 Claims, 4 Drawing Sheets

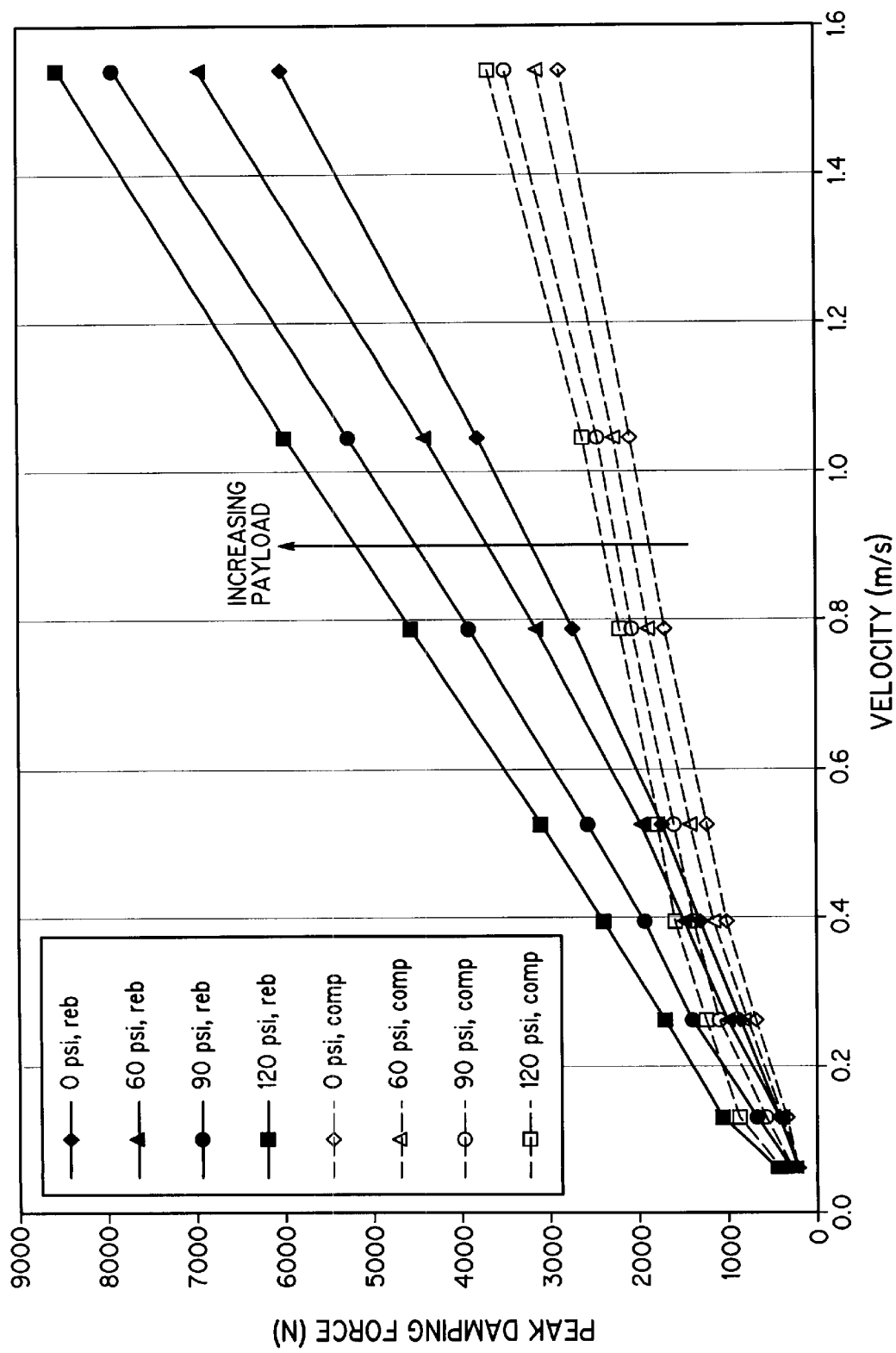

PISTON AND ROD ASSEMBLY FOR AIR-ACTUATED VARIABLE DAMPING

BACKGROUND OF THE INVENTION

This invention relates generally to a valved damper and more particularly, to a damper that is pneumatically controlled to provide variable damping forces.

Conventional vehicle suspension dampers typically consist of direct double-acting telescopic hydraulic passive dampers. They are generally described as either shock absorbers or struts. A primary purpose of shock absorbers is to dampen oscillations of the vehicle suspension spring. This is accomplished by converting kinetic energy in the form of motion between sprung and unsprung masses of a vehicle into heat and then dissipating the heat. Struts also serve this capacity and in addition, support reaction and side-load forces on the suspension.

Typical dampers are hydraulic devices using oil as the fluid medium for converting motion into heat. As the damper is cycled, a piston is forced to move in extension and compression directions through the oil that is contained within a cylinder tube. This creates pressure within a portion of the cylinder tube and a consequent pressure drop across the piston. During an extension stroke, high pressure is created in the extension chamber of the cylinder tube above the piston, forcing oil to flow through the valving of the piston. During a compression stroke, high pressure is created in the compression chamber of the cylinder tube below the piston, forcing oil to flow back through the piston's valving.

As oil is forced to flow through the orifices in the piston a pressure drop is effected and the oil is heated. In this way, the damper dissipates energy stored by the vehicle's suspension springs. The extent to which the oil is heated and consequently, the amount of energy dissipated is controlled by the size of the orifices in the piston and the amount of flow forced through the piston valving.

Damping force is a common measurement of the performance of a damper. It is used to quantify the amount of spring control provided by a damper. Passive dampers are tuned to provide selected vehicle performance characteristics. Because passive dampers provide a set damping characteristic they are generally somewhat of a compromise in providing optimum damping performance over a wide range of operating conditions.

The concept of dampers with an electrically controlled damping force has been developed in the art wherein an algorithm is used to provide a control mechanism as a means of varying the damping force provided by a damper. One example is shown in U.S. Pat. No. 5,690,195 hereby incorporated by reference. Electrical control is typically achieved by varying the valving orifices in response to various sensors which are used to detect vehicle operating conditions. Such dampers adjust the damping force in response to the control mechanism so that various performance characteristics can be provided by an individual damper. An electrically controllable orifice however, provides less than ideal levels of control at low flow rates.

Electrically controlled hydraulic dampers for vehicle suspensions have, in principle, been known in the art for some time. However, their actual widespread application and use have been tempered because of the expense of such a system.

SUMMARY OF THE INVENTION

This invention solves the above-described and other problems associated with known systems by providing a damper with variable damping fluid flow control in a preferred monotube design. This is accomplished through variable state pressure regulation in a valved damper piston. A damper in accordance with a preferred embodiment of this invention includes a cylinder slidably carrying a piston which separates the cylinder into extension and compression chambers. The piston carries a control valve for controlling fluid flow through the piston. The control valve provides a variable amount of damping force by regulating damper fluid flow between the extension chamber and the compression chamber of the damper during extension and compression strokes. Pressure regulation across the piston is controlled through a primary and a secondary flow path in which the flow through the secondary flow path or branch is determined by the control valve. The primary flow path or branch remains open.

A first bi-directional, deflectable, single annular disc passive damping valve mechanism is positioned in the primary flow path of the piston between the extension and compression chambers. The first passive damping valve provides pressure regulation across the piston for both extension and compression strokes during all operation of the damper. A second bi-directional, deflectable, single annular disc passive damping valve mechanism is positioned in the secondary flow path of the piston between the extension and compression chambers. The second passive damping valve selectively provides pressure regulation across the piston in parallel with the first passive damping valve during both extension and compression strokes.

The control valve includes a movable element responsive to a control mechanism. The flow passage through the piston include a secondary flow path or second branch that communicates through ports in the control valve, and flow therethrough is alternately interrupted, completely or partially, or permitted as determined by the control mechanism or valve. When flow through the second branch is permitted by the control valve, the flow passage through the piston extends through the first passive valve and the control valve and through the second branch that includes the second passive valve in a parallel arrangement with the first passive valve. When flow through the second branch is interrupted by the control valve, the flow passage through the piston extends only through the first branch which includes the first passive valve individually.

The invention includes a hydraulic damper that uses pneumatic control of the control valve to vary damping levels. Air pressure from an air-suspension or air-leveling system of the vehicle is vented in a presently preferred embodiment of this invention to a bellows or air-pressure actuated control valve located in the piston. The bellows or control valve compresses in response to higher pressure from the air-suspension or air-leveling system. The compression of the bellows control valve controls the position of a spool valve and as the spool valve is closed, one of two parallel flow paths through the piston is closed. Each flow path has its own valving. When only one of the flow paths is open, a higher damping force is generated. As a result, a continuously variable damper provides varied damping force according to the vehicle payload and operating conditions.

The pneumatic control of the damper uses the air pressure of the vehicle's air-suspension or air-leveling systems to control the position of the spool valve. The air pressure input to the control valve varies according to the overall vehicle weight as well as the road conditions. As the damper is stroked due to road input, the pressure varies. Higher frequency pressure oscillations resulting from road input are filtered with an orifice mounted inside a hollow piston rod in an attempt to limit damper variation to only static vehicle weight. The resulting air pressure is used as an input to the bellows or air-actuated control valve. A higher vehicle payload will result in higher pressure surrounding the bellows resulting in contraction of the bellows. As the bellows contracts or compresses, the secondary flow path is blocked by the spool valve. A higher pressure surrounding the bellows will result in the bottom face of the bellows lifting and the spool valve and thereby shutting off the secondary flow path. The pneumatic system is isolated from the piston hydraulic system with seals that are held in place with a seal plate, seal retainer and piston adapter.

The air pressure input must first overcome a preload force before the bellows will move or compress. As a result, low pressures will not cause a change in the bellows and the spool valve will remain open. The control valve is biased by a spring into an open position. Both the primary and secondary valves are then open which generate damping forces optimized for normal driving conditions when the vehicle is not heavily loaded. In the case of a pressure supply failure, the vehicle still operates optimally when it is not heavily loaded. When the vehicle is heavily loaded, the air pressure reaching the bellows is also higher thereby causing the bellows to compress, the spool valve to move toward the closed position and the overall damping forces to be higher. At intermediate payloads, the spool valve will only be partially moved and the secondary flow path is partially blocked resulting in intermediate damping forces. As a result, the damper is continuously variable over the given pressure range. Changing the characteristics of the bellows, the spool spring, bellows compression preload or the orifice insert will tune the performance of the damper.

Advantages of the present invention include internal packaging of the control valve in the piston which utilizes less space than externally packaged designs that carry the control valve outside the cylinder tube or designs that carry components of the control valve within the piston rod. Additionally, the damper of this invention reduces the total number of parts and can be easily included in common air-leveling systems. Moreover, the invention is adaptable to vehicles with other pressurized air systems (i.e., air brakes). The invention provides continuously variable control without the need for electronic control systems or electrical connections.

BRIEF DESCRIPTION OF THE DRAWINGS

The objectives and features of the invention will become more readily apparent from the following detailed description taken in conjunction with the accompanying drawings in which:

FIG. 4 is a graph including a range of pressure conditions showing damping force graphed on the abscissa and velocity graphed on the ordinate for the damper of FIG. 1.

DETAILED DESCRIPTION OF THE PRESENTLY PREFERRED EMBODIMENT

Figure 1:
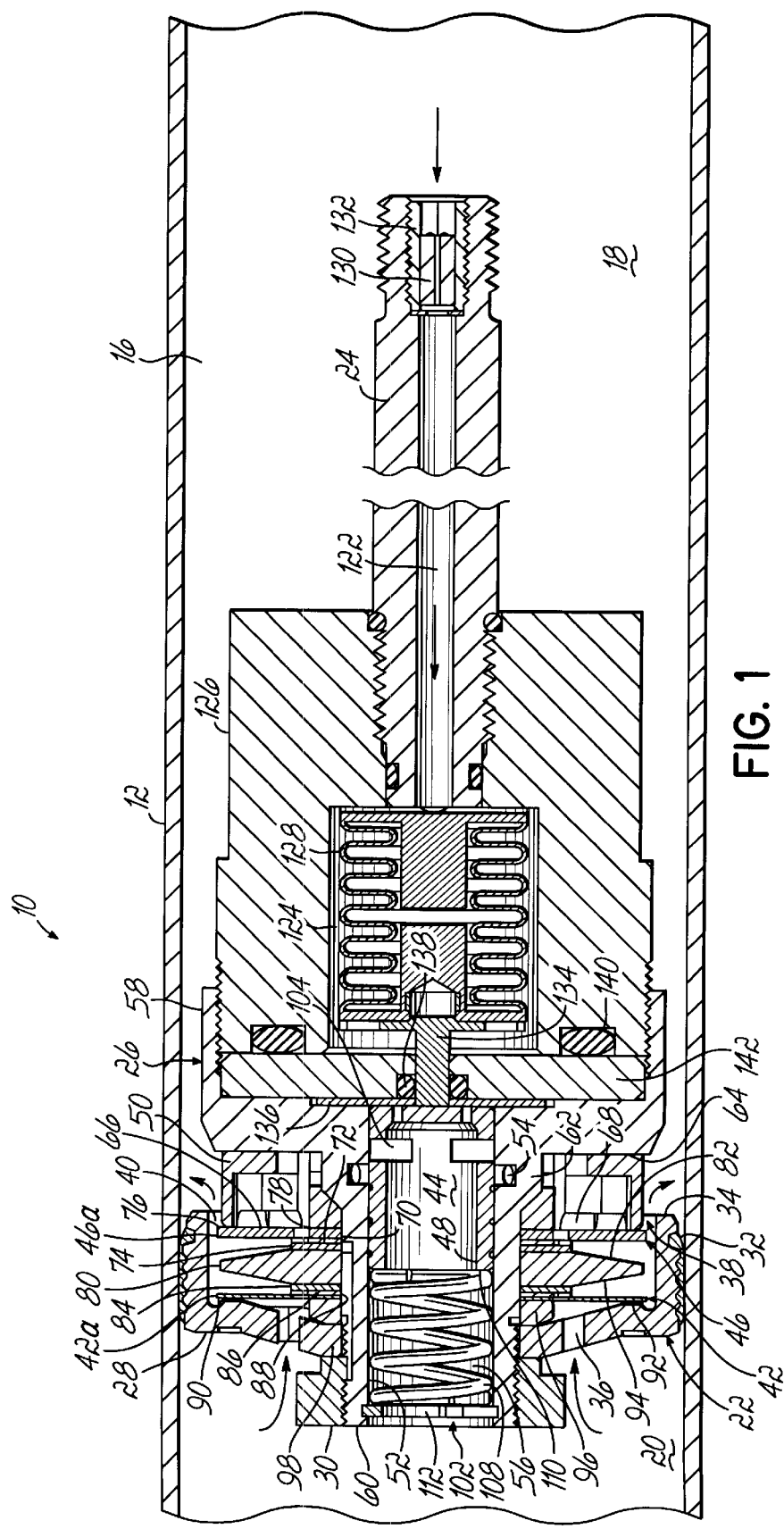
FIG. 1 is a fragmentary cross sectional view of a presently preferred embodiment of a damper according to this invention with a control valve in a closed position.
Figure 2:
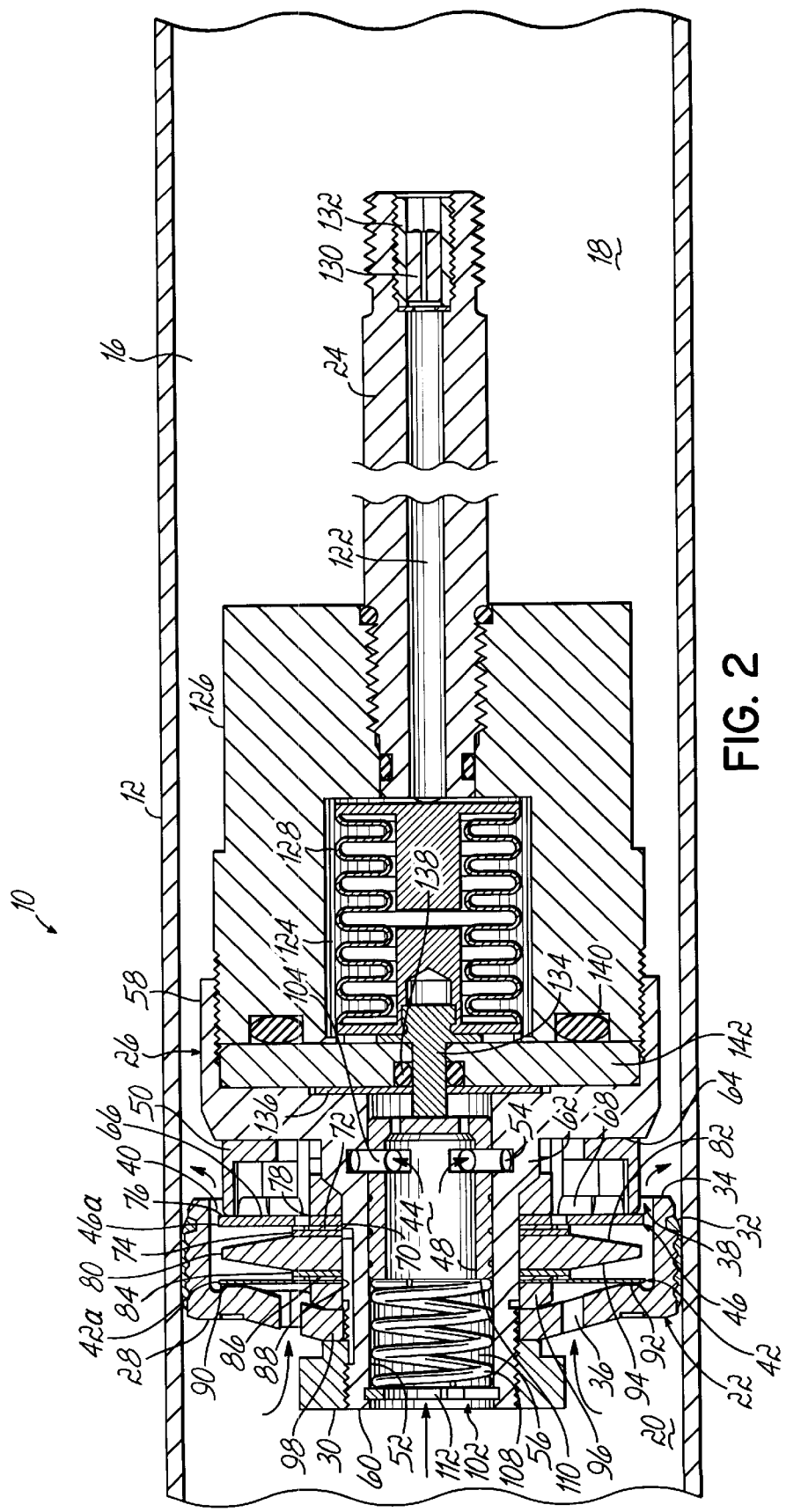
FIG. 2 is a view of the piston assembly of FIG. 1 with the control valve in an open position.

Referring to the drawings, illustrated in FIGS. 1 and 2 is an alternating state pressure regulation valved monotube suspension damper embodied as a shock absorber 10 according to a presently preferred embodiment of this invention. The vehicle suspension damper or shock absorber 10 includes a single tube designated as cylinder 12. Cylinder 12 has a closed lower end (not illustrated), and an upper end closed by a rod guide (not illustrated), in a conventional manner defining cylindrical cavity 16. Cavity 16 is divided into an extension chamber 18 and a compression chamber 20 by a piston assembly 22. Piston assembly 22 is sealingly disposed in cylinder 12 for slidable axial movement therein.

Securely connected to piston assembly 22 is piston rod 24 which extends through the extension chamber 18 of the cylinder tube 12 exiting the cavity 16 through the rod guide. The upper end of the piston rod 24 is adapted for connection to the sprung mass (body), of the motor vehicle (not illustrated), in a conventional manner. A similar means of attachment is provided at the lower end (not illustrated), of cylinder 12 for connection to the unsprung mass (wheel assembly), of the vehicle in a conventional manner. Relative movement between the sprung and unsprung masses of the vehicle, to which shock absorber 10 is connectable, produces relative axial sliding movement of the piston assembly 22 within the cylinder 12.

The piston assembly 22 includes a control valve assembly 26 that is carried on the bottom of the rod 24 and is connected therewith by mating threads. A piston cup 28 is mounted on the control valve assembly 26 and is fixed thereon by a threaded nut 30. The piston cup 28 includes a seal ring 32 made of low friction material. Seal ring 32 sealingly bears against the cylinder 12 providing fluid separation between the compression chamber 20 and the extension chamber 18.

The piston cup 28 spans between the control valve assembly 26 and the cylinder 12 opening at its top to the extension chamber 18 within the rim 34. Piston cup 28 is provided with a plurality of openings 36 which open the interior of the piston cup 28 to the compression chamber 20. Therefore, a flow passage 38 is provided through the piston assembly 22 between the compression chamber 20 and the extension chamber 18. The flow passage 38, and more specifically a first or primary branch 40 thereof, is normally closed by the first or primary valve assembly 42. A second or secondary branch 44 of the flow passage 38 extends through a spool valve 48 of the control valve assembly 26 and the second valve assembly 46 in parallel to the branch 40.

More specifically, a valve plate 50 is positioned on the control valve partially within the piston cup 28 and supports the primary valve 42 in the form of a bi-directional, deflectable, single annular valve disc 42a. A second bi-directional, deflectable, single annular valve disc 46a is supported by the piston cup 28. The spool valve 48 is carried within the control valve assembly 26 in central bore 52 and operates to selectively provide the flow path 44 between the openings 54 and 56 through the control valve assembly 26. Accordingly, during compression or extension travel of the piston assembly 22 within the cylinder 12 fluid flow between the extension chamber 18 and the compression chamber 20 can be through either of two branches 40 and 44 through the flow passage 38 across the piston assembly 22.

When the spool valve 48 is in the open position as shown in FIG. 2, fluid flow travels through the primary valve assembly 42, deflecting the disc 42a if pressure differentials dictate, and through the spool valve 48 and secondary valve assembly 46 deflecting disc 46a providing one level of damping typically for lighter vehicle loading conditions.

This effects a first pressure drop for fluid travel across the piston assembly 22 providing a first degree of pressure regulation for a first state of operation of the shock absorber 10. When the spool valve 48 is moved to its closed position (see FIG. 1), fluid flow between the extension chamber 18 and the compression chamber 20 travels solely through primary valve assembly 42 deflecting disc 42a providing another level of damping typically for heavy vehicle loading. This effects a second pressure drop for fluid travel across the piston assembly 22 providing a second degree of pressure regulation for a second state of operation of the shock absorber 10.

For more specificity, additional reference is directed to FIG. 2, along with FIG. 1. The control valve assembly 26 includes housing 58 and substantially cylindrical body 60. The second flow path of branch 44 is effected through the control valve assembly 26 between the openings 54 provided in the side of cylindrical body 60 and the opening 56 provided in the end of cylindrical body 60 at the bottom of piston assembly 22. The spool valve 48 is active during operation of the shock absorber 10, in-that, it is selectively positioned so that an open, intermediate or closed flow path 44 is provided between the openings 54 and 56.

The piston cup 28 is received on the cylindrical body 60 of the control valve assembly 26 and fixed thereon by the nut 30 thereby additionally carrying the various passive valving components of the piston assembly 22. Valve assemblies 42 and 46 of the piston assembly 22 are passive, in-that they respond only by deflection upon the presence of fluid pressure differentials at various stages across the piston assembly 22.

The juncture between the cylindrical body 60 and the housing 58 of the control valve assembly 26 includes an annular shoulder 62. A plurality of radially extending openings 54 are formed through the cylindrical body 60 at the annular shoulder 62 intersecting the central bore 52. The spool valve assembly 48 opens and closes the openings 54 to the central bore 52.

A valve plate 50 is positioned over the cylindrical body 60 receiving the annular shoulder 62 within counterbore 64 and bearing against the housing 58. An annular groove 66 is formed in the valve plate 50. A number of openings 68 extend through the valve plate 50 providing a passage between the openings 54 and the annular groove 66. Therefore, when the spool control valve 48 is open, the secondary branch 44 of passage 38 is open through the central bore 52, openings 54 and openings 68 to the annular groove 66.

Valve assembly 46 includes the valve disc 46a that is received over the cylindrical body 60 of control valve assembly 26 against the valve plate 50. The valve disc 46a includes an inner circumference 70 that is spaced away from the cylindrical body 60. A center disc 72 is received over the cylindrical body 60 within the inner circumference 70. The center disc 72 includes a plurality of arms (not shown) that extend radially outward and operate to maintain the valve disc 46a in an operable position.

A support disc 74 is positioned over the cylindrical body 60 adjacent the valve disc 46a and center disc 72. The support disc 74 includes a number of notches (not shown) formed around its outer perimeter. The arms (not shown) remaining between each pair of these adjacent notches provide a bearing surface for the inner periphery 70 of the valve disc 46a. The outer periphery 76 of the valve disc 46a bears against an annular rib 78 of the valve plate 50. The annular groove 66 spans radially across a portion of the center disc 72 and the valve disc 46a. The valve disc 46a as positioned by the center disc 72 on the cylindrical body 60, is biased between the arms at the outer periphery of the support disc 74 and the annular rib 78 of the valve plate 50.

An annular stop plate 80 is positioned over the cylindrical body 60 of control valve assembly 26 engaging the secondary valve assembly 46 and maintaining the components thereof in axial position. The stop plate 80 includes an angled annular wall 82. The annular wall 82 provides a stop for valve disc 46a when it is deflected. The annular wall 82 is oriented such that when the valve disc 46a is fully deflected during extension travel of the shock absorber 10, with its inner circumference 70 supported on the support disc 74, the valve disc 46a is positioned against the annular wall 82.

The primary passive valve assembly 42 including support disc 84, center disc 86 and valve disc 42a is received over the cylindrical body 60 of control valve 26 adjacent the stop plate 80. The support disc 84 includes a plurality of arms (not shown) like the arms of support disc 74. The center disc 86 includes a plurality of arms (not shown) like the arms of center disc 72. The valve disc 42a is supported at its inner circumference 88 by the support disc 84 and at its outer periphery 90 by annular ledge 92 of piston cup 28. The valve disc 42a normally closes off the openings 36 through the piston cup 28. When the valve disc 42a is fully deflected during compression travel of the shock absorber 10, with its inner circumference 88 supported on support disc 86, the valve disc 42a is positioned flat against the angled annular wall 94 of stop plate 80.

A main spacer 96 is positioned against valve disc 42a bearing against the annular leg 98 of piston cup 28 with the nut 30 applying a fixed bias to the annular leg 98 maintaining the piston cup 28, the first and second valve assemblies 42, 46 and the valve plate 50 in position on the cylindrical extension 60 of control valve assembly 26. This applies a preload to the valve discs 46a and 42a in a predetermined manner to selectively effect the damping performance produced by their deflecting characteristics.

The control valve assembly 26 includes the cylindrical body 60 and housing 58. The valve spool 48 is received within the valve cylinder body 60 and coacts therewith to provide a means of opening and closing the secondary branch 44. The valve spool 48 includes a series of openings 104 registering with the openings 54 in the cylindrical body 60 to provide the second branch 44 passageway through the valve spool 48. When the valve spool 48 is in an open position (FIG. 2), the openings 104 and 54 register with each other. Depending upon the position of the valve spool 48, intermediate or partially opened positions may be provided when the openings 104 and 54 are only partially in register.

To close the spool valve 48, the openings 104 are placed out of registry with the openings 54, blocking off fluid flow through the second branch 44 of the control valve 26 by movement of the valve spool 48 rearwardly.

The present embodiment describes a normally open spool valve 48. When preferable, a closed valve 48 is provided by simply moving the axial location of the openings 104 out of registry with the openings 54. The spool valve 48 is biased toward the open position by a spring 108. The end 110 of the valve spool 48 is also open and receives the spring 108 that is engaged with snap ring 112 at piston assembly 22 at open end 102 and biases the valve spool 48 into the open position. The opening through the end 110 provides fluid balancing on opposed sides of the valve spool 48 to preempt the formation of opposing fluid forces across the valve spool 48.

The valve spool 48 is adjusted to and between the open, intermediate and closed positions pneumatically by an air pressure input generated in an air suspension or air leveling system 116 of the vehicle. Air pressure from the air suspension or air leveling system 116 of the vehicle is supplied to the end of the piston rod 24. This air pressure input to the suspension damper or shock absorber 10 is a function of the overall vehicle weight 118 as well as the road input or operating conditions 120 for the vehicle. The piston rod 24 is hollow and includes a generally cylindrical bore or channel 122 through which the air pressure input is delivered to a central chamber 124 within a piston adapter 126. A bellows or other expansible member 128 is located within the chamber 124 and is responsive to the air pressure input delivered thereto through the bore 122 in the piston rod 24. The piston rod 24 includes an orifice insert 130 seated within a sleeve 132 to filter or segregate out higher frequency pressure oscillations resulting typically from road input 120. As a result, the air pressure input received by the bellows 128 is primarily a static pressure resulting from changes in the vehicle weight 118. The higher the vehicle's payload, the higher pressure input value is experienced by the bellows 128. This results in a higher pressure surrounding the bellows 128 in the chamber 124. The greater the air pressure input in the chamber 124 surrounding the bellows 128 will result in contraction of the bellows 128.

The bellows 128 is coupled to a T-shaped push rod 134 which projects from the piston adapter 126 through a seal retainer 136 into contact with the spool valve 48. The spool valve is held against the push rod 134 by the spool spring 108 which his retained within the valve support cylinder body 60 by the snap ring 112.

The spool spring 108 biases the spool valve 48 and push rod 134 against the bellows 128. Therefore, as the bellows 128 compresses in response to higher air pressure input values, the push rod 134 face contacting the bellows 128 lifts and the spool valve 48 moves thereby shutting off the secondary branch 44 of the flow passage 38. The pneumatic portion of the air damper or shock absorber 10 is isolated from the hydraulic components with seals 138, 140 that are held in place against the seal plate 142, seal retainer 136 and piston adapter 126.

The air pressure input initially must overcome a bias or preload force of the spring 108 before the bellows 128 will move the spool valve 48. Thus, low air pressure input values will not cause a change in the bellows 128 and the spool valve 48 remains open. Both the primary and secondary branches 40, 44 are then open providing parallel hydraulic fluid flow paths. When spool valve 48 is open, damping forces are optimized for normal driving conditions when the vehicle is not heavily loaded. Therefore, in the case of a pressure supply failure, the vehicle will still drive optimally when it is not heavily loaded. This is a result of the spool valve 48 being biased toward the open position.

When the vehicle is heavily loaded, the air pressure input reaching the bellows 128 is also higher thereby causing the bellows 128 to compress, the spool valve 48 to move toward the closed position and the overall damping forces to be higher as shown in FIG. 4. At intermediate payloads, the spool valve 48 will be partially moved toward the closed position and the secondary branch 44 of the flow path 38 is partially blocked resulting in intermediate damping forces. As a result, the damper 10 is continuously variable over a given pressure range as shown in FIG. 4. The performance of the system can be tuned by changing the valving, bellows, spool spring, bellows compression preload or the orifice insert as desired.

Figure 3:
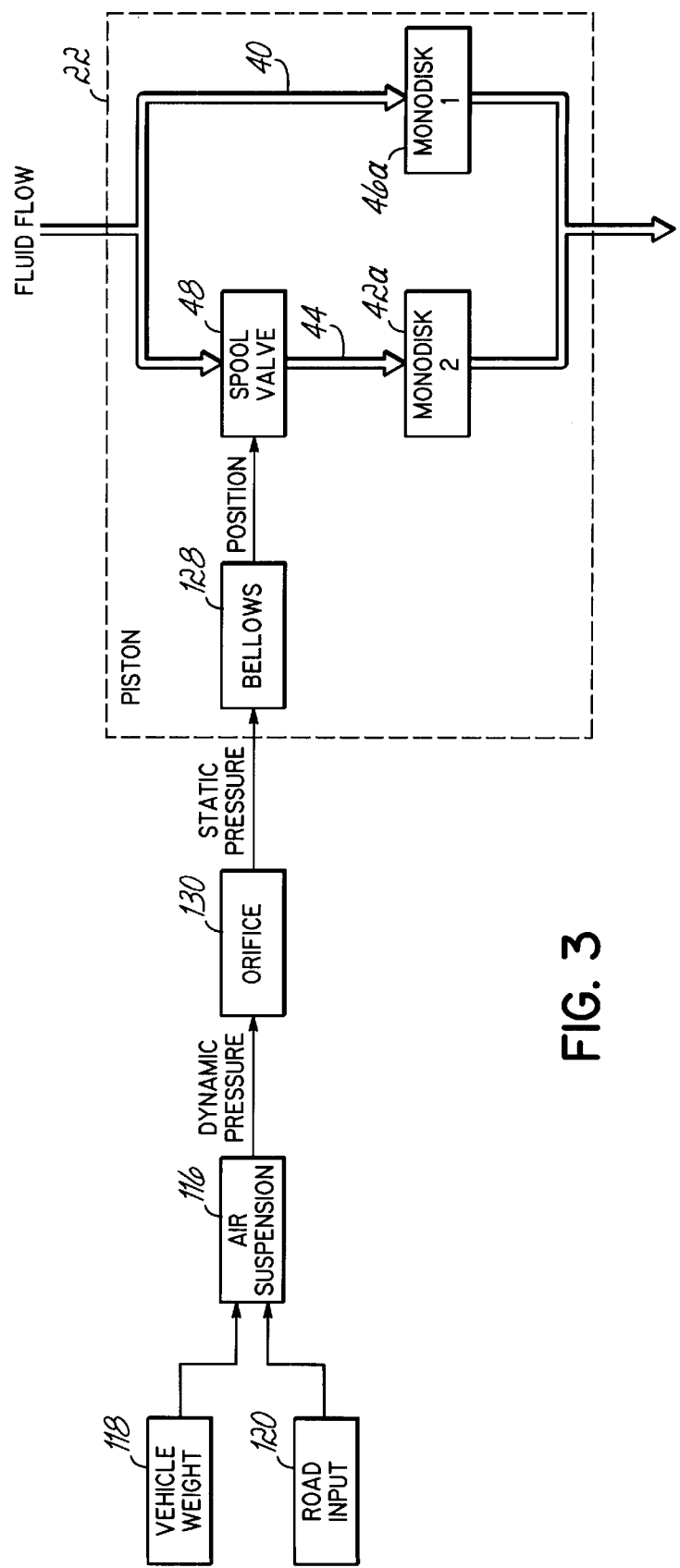
FIG. 3 is a schematic block diagram of the operation of the damper of FIG. 1.

Referring to FIG. 3, the operation of the hydraulic and pneumatic portions of the damper 10 according to a presently preferred embodiment of this invention is shown schematically. Vehicle weight 118 and road input 120 variables are determined by the air suspension or air leveling system 116 of the vehicle. The resulting dynamic pressure is then delivered to the orifice 130 in the rod 24 which then filters the higher frequency air input values as desired. The static pressure input is then transmitted through the piston rod 24 to the bellows 128 which adjusts a position of the spool valve 48 to and between the open, intermediate and closed positions. Depending upon the position of the spool valve 48, the hydraulic fluid may flow through the passage 38 in the primary or first branch 44 and the second branch provided that the spool valve 48 is at least partially opened.

During a compression stroke of the piston assembly 22 when the spool valve 48 is in an open position, fluid flow is permitted through opening 56 in the bottom of cylindrical extension 60 of control valve assembly 26. Fluid passes through the spool control valve 48 and the openings 54 and 68 to the annular groove 66. This defines part of the branch 44 of the flow passage 38 through the piston assembly 22. In the annular groove 66, the fluid applies pressure to the valve disc 46a which, in relation to the pressure applied thereto, deflects at its outer periphery 76 with the inner circumference 70 remaining supported on the support disc 74.

Deflection of the valve disc 46a opens a flow passage between the outer periphery 76 thereof, and annular leg 78 of valve plate 50, permitting fluid flow through the piston assembly 22 from the compression chamber 20 to the extension chamber 18 and vice versa. The valve disc 46a effects a pressure drop as the fluid flows through the piston assembly 22 which results in a damping effect for the travel of piston assembly 22 within cylinder 12.

During compression travel of the piston assembly 22 fluid pressure is also applied to the valve disc 42a. The valve disc 46a is designed to deflect under lower loading and therefore, the valve disc 42a remains substantially undeflected under low load conditions. However, since the valve discs 46a and 42a are arranged in parallel in the flow passage 38 with the spool control valve 48 open, a sufficiently high pressure differential across the piston assembly 22 will cause both valve discs 42a and 46a to open.

The damping effect produced during compression by the passive valves, with spool control valve 48 opening branch 44 of fluid passage 38, is shown in FIG. 4. The curves demonstrate the performance of the piston assembly 22 showing the damping force produced for a given velocity of travel through cylinder 12. The valve disc 46a is designed such that the damping effect it produces is evident when the spool control valve 48 is closed under higher payloads.

When the spool control valve 48 is closed, the flow path through the branch 44 of the flow passage 38 through the piston assembly 22 is closed. Therefore, during compression and extension strokes of the piston assembly 22 within the cylinder 12, fluid must flow through the branch 40. During a compression stroke of the piston assembly 22, when the spool control valve 48 is closed, a fluid pressure effected in compression chamber 20 is communicated through the piston 22.

Within the piston assembly 22, the fluid is open to the extension chamber 18. Therefore, fluid is permitted to flow from the compression chamber 20 to the extension chamber 18 through the branch 40 of flow passage 38 deflecting the valve disc 42a. This results in a pressure drop for fluid flow through the passage 38 across the piston assembly 22 and is graphed in FIG. 4 for compression and rebound travel by the curves. The performance curves demonstrate that for a given velocity of the piston assembly 22 a significantly greater force is developed during the damping or rebound operation of the shock absorber 10 as compared to the performance demonstrated by the compression curve.

During an extension stroke of the piston assembly 22 within the cylinder 12 with the spool control valve 48 closed, a pressure increase effected in extension chamber 18 is applied to the valve disc 42a and fluid flow travels through branch 40 of flow passage 38.

During extension of the shock absorber 10, as fluid flows through the branch 40 of passage 38 through the piston assembly 22 deflecting valve disc 42a, a pressure drop occurs which effects the damping performance graphed by the curves in FIG. 4. As is demonstrated by FIG. 4, the developed damping force resulting from a given velocity for the travel of piston assembly 22 within the cylinder 12 is significantly greater for the curves which graph the single valve disc 42a then for the curves which graph the parallel combination of an open or partially open spool control valve 48 and valve disc 46.

Through means of the foregoing structure a compact manner of regulating pressure by controlling the pressure drop as fluid flows from one side of the piston assembly 22 to the other is provided. The pressure drop is modified by a pneumatic input signal communicated to the control valve assembly 26, moving it between open, intermediate and closed positions. This selectively varies the relative damping force effected by the piston assembly 22, between the body and wheel of a vehicle to which the shock absorber 10 is assembled. Since the control valve assembly 26 is carried with the piston assembly 22 instead of within the rod 24, the rod diameter can remain relatively small for a damper with an internal valve. The relatively small rod size minimizes the amount of volumetric compensation required for fluid displacement resulting in reduced overall size requirements of the piston assembly 22 within the shock absorber 10. This tends to maximize the applications within which the shock absorber 10 can be utilized. The flow path 38 through the piston assembly 22, remains relatively direct for all variable states of the pressure regulation.

From the above disclosure of the general principles of the present invention and the preceding detailed description of at least one preferred embodiment, those skilled in the art will readily comprehend the various modifications to which this invention is susceptible. Therefore, we desire to be limited only by the scope of the following claims and equivalents thereof.

We claim:

1. A suspension damper comprising:
   a cylinder defining a cavity being substantially filled with a fluid;
   a piston slidably positioned in the cylinder separating the cavity into a compression chamber and an extension chamber;
   a rod coupled to the piston and extending through one of the chambers and exiting the cavity;
   a passage through which the fluid moves between the extension chamber and the compression chamber during sliding of the piston in the cylinder;
   an air pressure actuated control valve assembly responsive to an air pressure input for adjustment to and between a plurality of positions to control the movement of fluid in the passage between the extension and compression chambers;
   wherein the air pressure input is delivered to the air pressure control valve assembly via the rod; and
   a filter located in the rod to filter out selected ranges of the air pressure input;
   wherein a damping force of the suspension damper is a function of the air pressure input.

2. The suspension damper of claim 1 wherein the passage has a first branch and a second branch and the flow of the fluid through the second branch is controlled by the air pressure actuated control valve assembly.

3. The suspension member of claim 2 further comprising:
   a first and a second bi-directional deflectable annular disc in the first and second branches, respectively, to control the damping forces during movement of the piston toward both the extension and compression chambers.

4. The suspension member of claim 1 wherein the air pressure actuated control valve assembly adjusts to and between open, closed and intermediate positions to provide a variable damping force.

5. The suspension member of claim 1 wherein the air pressure actuated control valve assembly is biased toward an open position.

6. The suspension member of claim 1 wherein the air pressure actuated control valve assembly further comprises a spool valve.

7. The suspension member of claim 1 wherein the air pressure actuated control valve assembly further comprises a pneumatically expansible member.

8. The suspension member of claim 7 wherein the pneumatically expansible member further comprises a bellows.

9. The suspension member of claim 1 wherein the passage is through the piston.

10. The suspension member of claim 1 wherein the piston, the passage, the air pressure actuated control valve assembly and a portion of the rod are contained within the cylinder.

11. The suspension member of claim 10 wherein the air pressure actuated control valve assembly is in the piston.

12. A suspension damper comprising:
    a cylinder defining a cavity being substantially filled with a fluid;
    a piston slidably positioned in the cylinder separating the cavity into a compression chamber and an extension chamber;
    a rod coupled to the piston and extending through one of the chambers and exiting the cavity;
    a passage in the piston through which the fluid moves between the extension chamber and the compression chamber during sliding of the piston in the cylinder, the passage having a first branch and a second branch;
    an air pressure actuated control valve assembly located in the piston and being responsive to an air pressure input for adjustment to and between open, closed and intermediate positions to provide a variable damping force by controlling the movement of fluid in the second branch of the passage between the extension and compression chambers, the air pressure input being delivered to the air pressure actuated control valve via the rod, the air pressure actuated control valve assembly being biased toward an open position;
    wherein the air pressure actuated control valve assembly further comprises a spool valve coupled to a pneumatically expansible member; and
    a filter located in the rod to filter out selected ranges of the air pressure input;
    wherein a damping force of the suspension damper is a function of the air pressure input.

13. The suspension member of claim 12 further comprising:
   a first and a second bi-directional deflectable annular disc in the first and second branches, respectively, to control the damping forces during movement of the piston toward both the extension and compression chambers.

14. A suspension damper comprising:
   a cylinder defining a cavity being substantially filled with a fluid;
   a piston slidably positioned in the cylinder separating the cavity into a compression chamber and an extension chamber;
   a rod coupled to the piston and extending through one of the chambers and exiting the cavity;
   a passage through which the fluid moves between the extension chamber and the compression chamber during sliding of the piston in the cylinder;
   means for controlling the movement of the fluid in the passage between the extension and compression chambers, the controlling means being responsive to an air pressure input;
   wherein the air pressure input is delivered to the controlling means via the rod; and
   a filter located in the rod to filter out selected ranges of the air pressure input;
   wherein a damping force of the suspension damper is a function of the air pressure input.

15. A suspension system for a vehicle comprising:
   a pneumatic suspension sub-system selected from at least one of the following: a vehicle air-suspension system and a vehicle air-leveling system, the pneumatic suspension sub-system generating an air pressure value as a function of a weight of the vehicle and a condition of the road on which the vehicle travels;
   at least one damper comprising:
      a) a cylinder defining a cavity being substantially filled with a fluid;
      b) a piston slidably positioned in the cylinder separating the cavity into a compression chamber and an extension chamber;
      c) a rod coupled to the piston and extending through one of the chambers and exiting the cavity;
      d) a passage through which the fluid moves between the extension chamber and the compression chamber during sliding of the piston in the cylinder;
      e) an air pressure actuated control valve assembly to control the movement of fluid in the passage between the extension and compression chambers;
   wherein the damper is operably coupled to the pneumatic suspension sub-system to receive the air pressure value as an input to the air pressure actuated control valve assembly;
   wherein a damping force of the damper is a function of the air pressure value.

16. A method of adjusting a damping force of a vehicle suspension damper, the method comprising the steps of:
   generating an air pressure input from a pneumatic suspension sub-system selected from at least one of the following: a vehicle air-suspension system and a vehicle air-leveling system;
   wherein the generating of the air pressure input is derived from a weight of the vehicle and a condition of the road on which the vehicle travels;
   transmitting the air pressure input to the vehicle suspension damper;
   controlling a flow of fluid through a passage in the vehicle suspension damper through which the fluid may move between extension and compression chambers in the vehicle suspension damper;
   wherein the damping force is a function of the flow of fluid through the passage.

17. The method of claim 16 wherein the passage further comprises a first and a second branch and the controlling of the flow of fluid further comprises selectively restricting the flow through only the second branch.

18. The method of claim 16 wherein the controlling of the flow of fluid further comprises adjusting a control valve in the vehicle suspension damper to and between open, intermediate and closed positions.

19. The method of claim 18 further comprising:
   biasing the control valve toward the open position.

20. The method of claim 16 wherein the controlling of the flow of fluid provides a variable damping force from the vehicle suspension damper.

21. A method of adjusting a damping force of a vehicle suspension damper, the method comprising the steps of:
   generating an air pressure input from a pneumatic suspension sub-system selected from at least one of the following: a vehicle air-suspension system and a vehicle air-leveling system;
   transmitting the air pressure input to the vehicle suspension damper;
   controlling a flow of fluid through a passage in the vehicle suspension damper through which the fluid may move between extension and compression chambers in the vehicle suspension damper;
   wherein the damping force is a function of the flow of fluid through the passage; and
   filtering a portion of the air pressure input prior to transmitting it to the vehicle suspension damper.

22. A method of adjusting a damping force of a vehicle suspension damper, the method comprising the steps of:
   generating an air pressure input from a pneumatic suspension sub-system selected from at least one of the following: a vehicle air-suspension system and a vehicle air-leveling system, the air pressure input being derived from a weight of the vehicle and a condition of the road on which the vehicle travels.;
   filtering a portion of the air pressure input;
   transmitting the air pressure input to the vehicle suspension damper;
   controlling a flow of fluid through a passage in the vehicle suspension damper through which the fluid may move between extension and compression chambers in the vehicle suspension damper, the passage further comprising a first and a second branch and the controlling of the flow of fluid further comprising selectively restricting the flow through only the second branch by adjusting a control valve in the vehicle suspension damper to and between open, intermediate and closed positions;
   biasing the control valve toward the open position;
   wherein the damping force is a function of the flow of fluid through the passage.

* * * * *